(12) United States Patent
Broker et al.

(10) Patent No.: US 7,449,229 B2
(45) Date of Patent: Nov. 11, 2008

(54) SYSTEM AND METHOD FOR MAKING EXTRUDED, COMPOSITE MATERIAL

(75) Inventors: Sean Robert Broker, Keno, OR (US); Jonathan Philip Alexander, Klamath Falls, OR (US); David J. Bleha, Klamath Falls, OR (US); Randy Jon Clark, Klamath Falls, OR (US); Walter B. Davis, Klamath Falls, OR (US)

(73) Assignee: Jeld-Wen, inc., Klamath Falls, OR (US)

( * ) Notice: Subject to any disclaimer, the term of this patent is extended or adjusted under 35 U.S.C. 154(b) by 94 days.

(21) Appl. No.: 10/285,449

(22) Filed: Nov. 1, 2002

(65) Prior Publication Data
US 2004/0084799 A1    May 6, 2004

(51) Int. Cl.
*B32B 5/12* (2006.01)
(52) U.S. Cl. .................. 428/106; 428/113; 428/220; 428/297.4; 428/326; 428/332; 428/401; 428/484.1; 524/14; 524/16; 524/27
(58) Field of Classification Search ............... 428/105, 428/106, 113, 220, 297.4, 326, 327, 332, 428/357, 375, 401, 403, 407, 484.1, 500, 428/507, 502, 503, 505, 511, 532, 537.1, 428/528; 524/14, 27, 16
See application file for complete search history.

(56) References Cited

U.S. PATENT DOCUMENTS

| | | |
|---|---|---|
| 619,676 A | 2/1899 | Cronin |
| 670,939 A | 4/1901 | Rapp |
| 877,922 A | 2/1908 | Gager |
| 1,183,842 A | 5/1916 | Alling |
| D132,040 S | 4/1942 | Cummings |
| 2,343,740 A | 3/1944 | Birmingham |

(Continued)

FOREIGN PATENT DOCUMENTS

CA      57271      10/1986

(Continued)

OTHER PUBLICATIONS

PCT Search Report corresponding to PCT/US03/34489 mailed on May 3, 2004.

(Continued)

*Primary Examiner*—Michael Miggins
(74) *Attorney, Agent, or Firm*—Nelson Mullins Riley & Scarborough, LLP

(57) ABSTRACT

Systems and methods for making a material composition are disclosed. The method includes mixing a thermoset polymer, a petroleum distillate, a release agent, and a catalyst to form an admixture. A cellulosic material is mixed with the admixture to form a generally homogenous furnish. The system includes a mixing chamber, a feeding chamber, and a die. The die includes a pressing chamber, which has a volume formed by first and second platens. The platens are in facing opposition to one another and have a length extending continuously from an entrance to an exit of the die. The platens have a plurality of orifices and heating elements disposed along the length. The platens are disposed in first and second positions. The first position forms a first volume and the second position forms a second volume.

17 Claims, 8 Drawing Sheets

U.S. PATENT DOCUMENTS

| | | | |
|---|---|---|---|
| 2,519,442 A | 8/1950 | Delorme et al. ............ 260/17.4 |
| 2,682,083 A | 6/1954 | Patton |
| 2,797,450 A | 7/1957 | Ropella |
| 2,831,793 A | 4/1958 | Elmendorf |
| 3,098,781 A | 7/1963 | Greten |
| 3,121,263 A | 2/1964 | Binner |
| 3,212,948 A | 10/1965 | McMahon |
| 3,295,167 A | 1/1967 | Corbin |
| 3,308,013 A | 3/1967 | Bryant |
| 3,484,994 A | 12/1969 | Ashby et al. |
| 3,493,527 A | 2/1970 | Schueler ..................... 260/17.2 |
| 3,512,304 A | 5/1970 | Meuret |
| 3,533,190 A | 10/1970 | Hilfinger et al. |
| 3,546,143 A | 12/1970 | Corbett ........................ 260/2.5 |
| 3,546,841 A | 12/1970 | Smith et al. |
| 3,560,255 A | 2/1971 | Maine ......................... 117/148 |
| D222,775 S | 12/1971 | Sartori |
| 3,639,200 A | 2/1972 | Elmendorf et al. |
| 3,697,364 A | 10/1972 | Boustany et al. ............... 161/59 |
| 3,704,161 A | 11/1972 | Yamaguchi et al. .......... 117/148 |
| 3,790,401 A | 2/1974 | Maine ......................... 117/59 |
| 3,793,125 A | 2/1974 | Kunz |
| 3,796,586 A | 3/1974 | Hanlon et al. |
| 3,808,030 A | 4/1974 | Bell ............................ 117/64 |
| 3,899,860 A | 8/1975 | Newell |
| 3,905,847 A | 9/1975 | Black |
| 3,908,902 A | 9/1975 | Collins et al. .................. 238/83 |
| 3,933,704 A | 1/1976 | Siegler et al. |
| 3,943,079 A | 3/1976 | Hamed ................. 260/17.4 BB |
| 3,987,599 A | 10/1976 | Hines |
| 3,988,270 A | 10/1976 | Willis, Jr. et al. ........ 260/17.4 R |
| 4,003,866 A | 1/1977 | Paturle .................. 260/17.4 R |
| 4,023,776 A * | 5/1977 | Greten ..................... 366/153.2 |
| D244,736 S | 6/1977 | Palka |
| D245,824 S | 9/1977 | Palka |
| 4,104,828 A | 8/1978 | Naslund et al. |
| 4,142,007 A | 2/1979 | Lampe et al. |
| 4,146,662 A | 3/1979 | Eggers et al. |
| 4,165,302 A | 8/1979 | Armenti et al. ................. 260/8 |
| 4,168,251 A | 9/1979 | Schinzel et al. .......... 260/17.4 R |
| 4,176,095 A | 11/1979 | Aziz et al. ...................... 260/9 |
| 4,183,187 A | 1/1980 | Simard |
| 4,212,928 A | 7/1980 | Arney, Jr. ................... 428/514 |
| 4,236,365 A | 12/1980 | Wheeler |
| 4,241,133 A * | 12/1980 | Lund et al. .................. 428/326 |
| 4,246,310 A | 1/1981 | Hunt et al. |
| 4,248,163 A | 2/1981 | Caughey et al. |
| 4,248,743 A | 2/1981 | Goettler ................ 260/17.4 BB |
| 4,250,214 A | 2/1981 | Broxterman et al. ........ 428/514 |
| 4,268,565 A | 5/1981 | Luck et al. |
| 4,277,428 A | 7/1981 | Luck et al. |
| 4,279,790 A | 7/1981 | Nakajima .............. 260/17.4 R |
| 4,307,155 A | 12/1981 | Broxterman et al. ........ 428/514 |
| D266,042 S | 9/1982 | Moore et al. |
| 4,350,543 A | 9/1982 | Bruguera |
| D266,720 S | 11/1982 | Moore et al. |
| 4,361,612 A | 11/1982 | Shaner et al. |
| 4,364,984 A | 12/1982 | Wentworth |
| 4,376,144 A | 3/1983 | Goettler ....................... 428/36 |
| 4,437,824 A | 3/1984 | Palotai |
| 4,441,296 A | 4/1984 | Grabendike et al. |
| D274,107 S | 6/1984 | Gordon |
| D274,944 S | 7/1984 | Coppa |
| 4,478,966 A | 10/1984 | Helgesson et al. ............. 524/13 |
| 4,480,061 A | 10/1984 | Coughlin et al. .............. 524/13 |
| 4,491,553 A | 1/1985 | Yamada et al. ................ 264/51 |
| 4,503,115 A | 3/1985 | Hemels et al. |
| 4,510,278 A * | 4/1985 | Hoetjer ........................ 524/14 |
| 4,528,309 A | 7/1985 | Göte et al. .................... 524/13 |
| 4,544,440 A | 10/1985 | Wheeler |
| 4,550,540 A | 11/1985 | Thorn |
| 4,552,797 A | 11/1985 | Munk et al. |
| D282,426 S | 2/1986 | Heimberger et al. |
| 4,579,613 A | 4/1986 | Belanger |
| 4,610,900 A | 9/1986 | Nishibori |
| 4,610,913 A | 9/1986 | Barnes |
| 4,611,979 A | 9/1986 | Hegenstaller et al. |
| D286,177 S | 10/1986 | Case et al. |
| 4,622,190 A | 11/1986 | Schultz |
| 4,643,787 A | 2/1987 | Goodman |
| 4,645,631 A | 2/1987 | Hegenstaller et al. |
| D292,766 S | 11/1987 | Palka |
| 4,706,431 A | 11/1987 | Corvese |
| 4,720,363 A | 1/1988 | Mayumi et al. |
| 4,737,532 A | 4/1988 | Fujita et al. ................... 524/13 |
| 4,746,688 A | 5/1988 | Bistak et al. ................. 523/220 |
| 4,783,493 A | 11/1988 | Motegi et al. ................. 524/13 |
| 4,811,538 A | 3/1989 | Lehnert |
| 4,822,826 A | 4/1989 | Pommier et al. ............. 521/84.1 |
| 4,830,929 A | 5/1989 | Ikeda et al. |
| 4,833,181 A | 5/1989 | Narukawa et al. ............. 524/13 |
| 4,853,062 A | 8/1989 | Gartland |
| 4,866,110 A | 9/1989 | Lee ............................ 524/11 |
| 4,876,838 A | 10/1989 | Hagemeyer |
| D304,983 S | 12/1989 | Palka |
| 4,890,795 A | 1/1990 | Da Re' ......................... 241/3 |
| 4,896,471 A | 1/1990 | Turner |
| 4,897,975 A | 2/1990 | Artwick et al. |
| 4,908,990 A | 3/1990 | Yoon et al. |
| 4,915,764 A | 4/1990 | Miani .................... 165/244.19 |
| 4,942,084 A | 7/1990 | Prince |
| D311,957 S | 11/1990 | Hall |
| D314,242 S | 1/1991 | Mikolaitis |
| D314,625 S | 2/1991 | Hall |
| 5,016,414 A | 5/1991 | Wang |
| 5,019,311 A | 5/1991 | Koslow |
| D319,884 S | 9/1991 | Hall |
| 5,064,592 A | 11/1991 | Ueda et al. .................. 264/112 |
| 5,074,087 A | 12/1991 | Green |
| 5,074,092 A | 12/1991 | Norlander |
| 5,075,059 A | 12/1991 | Green |
| 5,082,605 A | 1/1992 | Brooks et al. ............... 264/40.6 |
| 5,088,910 A | 2/1992 | Goforth et al. .............. 425/142 |
| 5,126,088 A | 6/1992 | Andres et al. |
| 5,142,835 A | 9/1992 | Mrocca |
| 5,147,722 A | 9/1992 | Koslow |
| 5,164,432 A | 11/1992 | Dehennau et al. ............. 524/13 |
| 5,167,105 A | 12/1992 | Isban et al. |
| 5,189,092 A | 2/1993 | Koslow |
| D335,982 S | 6/1993 | Brandon |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| 5,331,037 A | 7/1994 | Koslow |
| D349,352 S | 8/1994 | Csati |
| 5,344,484 A | 9/1994 | Walsh ........................ 106/201 |
| 5,346,930 A | 9/1994 | Maine et al. ................. 523/164 |
| 5,355,654 A | 10/1994 | Stanley |
| 5,369,869 A | 12/1994 | Bies et al. |
| 5,397,406 A | 3/1995 | Vaders |
| 5,401,556 A | 3/1995 | Ishitoya et al. |
| 5,406,768 A | 4/1995 | Giuseppe et al. ............ 52/730.4 |
| 5,415,943 A | 5/1995 | Groger et al. ............. 428/537.1 |
| 5,424,023 A | 6/1995 | Riley et al. .................. 264/560 |
| 5,439,749 A | 8/1995 | Klasell et al. ............. 428/537.1 |
| 5,441,787 A | 8/1995 | Fujii et al. ..................... 428/57 |
| 5,441,801 A | 8/1995 | Deaner et al. ................ 428/326 |
| 5,443,891 A | 8/1995 | Bach |
| 5,470,631 A | 11/1995 | Lindquist et al. |
| 5,480,602 A | 1/1996 | Nagaich |
| 5,486,553 A | 1/1996 | Deaner et al. ................. 524/13 |
| D366,939 S | 2/1996 | Schafernak |

| | | |
|---|---|---|
| D367,121 S | 2/1996 | Schafernak |
| 5,497,594 A | 3/1996 | Giuseppe et al. ............ 52/730.4 |
| 5,502,088 A | 3/1996 | Hododi ........................ 524/34 |
| 5,505,238 A | 4/1996 | Fujii et al. .................. 144/2 R |
| D370,269 S | 5/1996 | Schafernak |
| 5,516,472 A | 5/1996 | Laver .......................... 264/118 |
| 5,518,677 A | 5/1996 | Deaner et al. ............... 264/142 |
| D371,852 S | 7/1996 | Schafernak |
| 5,539,027 A | 7/1996 | Deaner et al. ................. 524/13 |
| 5,539,028 A | 7/1996 | Bednar et al. ................. 524/47 |
| 5,543,234 A | 8/1996 | Lynch et al. |
| D375,424 S | 11/1996 | Burwick |
| 5,585,155 A | 12/1996 | Heikkila et al. ............ 428/36.7 |
| 5,624,616 A | 4/1997 | Brooks ........................ 264/83 |
| 5,633,299 A | 5/1997 | Van Druten et al. ........... 524/14 |
| 5,635,125 A | 6/1997 | Ternes et al. ........... 264/328.18 |
| D382,350 S | 8/1997 | Lynch |
| 5,677,369 A | 10/1997 | Walsh ........................ 524/14 |
| D388,196 S | 12/1997 | Schafernak et al. |
| 5,700,555 A | 12/1997 | Grill .......................... 428/233 |
| 5,716,563 A | 2/1998 | Winterowd et al. ........ 264/45.5 |
| 5,725,939 A | 3/1998 | Nishibori ................. 428/292.4 |
| 5,746,958 A | 5/1998 | Gustafsson et al. ......... 264/115 |
| 5,766,774 A | 6/1998 | Lynch et al. |
| 5,773,138 A | 6/1998 | Seethamraju et al. ....... 428/326 |
| 5,795,641 A | 8/1998 | Pauley et al. ................ 428/134 |
| 5,827,607 A | 10/1998 | Deaner et al. ............... 428/326 |
| 5,840,787 A | 11/1998 | West et al. .................... 524/35 |
| 5,847,016 A | 12/1998 | Cope .......................... 521/84.1 |
| 5,851,469 A | 12/1998 | Muller et al. ............ 264/177.1 |
| 5,855,832 A | 1/1999 | Clausi |
| 5,866,641 A | 2/1999 | Ronden et al. |
| 5,882,564 A | 3/1999 | Puppin .................. 264/177.16 |
| 5,887,402 A | 3/1999 | Ruggle et al. |
| 5,900,463 A | 5/1999 | Tanimoto et al. |
| D411,022 S | 6/1999 | Schafernak et al. |
| 5,927,359 A | 7/1999 | Kersten |
| 5,932,334 A | 8/1999 | Deanner et al. |
| 5,941,032 A | 8/1999 | Lydon, Jr. |
| 5,942,058 A * | 8/1999 | Sleeter et al. ............. 156/62.2 |
| 5,948,524 A | 9/1999 | Seethamraju et al. ....... 428/326 |
| 5,951,927 A | 9/1999 | Cope |
| 5,981,631 A | 11/1999 | Ronden et al. |
| 5,989,681 A | 11/1999 | Martino ........................ 428/151 |
| 6,011,091 A | 1/2000 | Zehner ........................ 524/13 |
| 6,015,612 A | 1/2000 | Deaner et al. ............... 428/326 |
| 6,024,908 A | 2/2000 | Koncelik |
| 6,066,680 A | 5/2000 | Cope |
| D426,645 S | 6/2000 | Bonomo et al. |
| 6,073,419 A | 6/2000 | Moyes |
| 6,172,144 B1 | 1/2001 | Yekani |
| 6,180,257 B1 | 1/2001 | Brandt et al. |
| 6,200,687 B1 | 3/2001 | Smith et al. |
| 6,204,312 B1 | 3/2001 | Taylor |
| 6,277,943 B1 | 8/2001 | Sharpeshkar et al. .......... 528/65 |
| 6,280,667 B1 | 8/2001 | Koenig et al. |
| 6,322,731 B1 | 11/2001 | Pagden |
| 6,344,504 B1 | 2/2002 | Zehner et al. |
| 6,378,266 B1 | 4/2002 | Ellingson |
| 6,399,719 B1 | 6/2002 | Dopico et al. |
| 6,458,238 B1 | 10/2002 | Mente et al. |
| 6,464,820 B2 | 10/2002 | Mente et al. |
| 6,470,940 B1 | 10/2002 | Pu et al. |
| 6,531,010 B2 | 3/2003 | Puppin |
| 6,884,852 B1 | 4/2005 | Klauck et al. ............... 525/458 |
| 2001/0026862 A1 | 10/2001 | Smith et al. |
| 2003/0160363 A1* | 8/2003 | Massidda et al. ............ 264/338 |
| 2004/0040625 A1* | 3/2004 | Knokey et al. .............. 144/347 |

FOREIGN PATENT DOCUMENTS

| | | |
|---|---|---|
| DE | 3801486 A1 | 8/1989 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0 688 639 A3 | 3/1996 |
| EP | 0 747 419 A2 | 12/1996 |
| EP | 0 807 510 A1 | 11/1997 |

OTHER PUBLICATIONS

U.S. Appl. No. 10/426,573, filed Apr. 30, 2003, G. A. Davina et al.
"Factory-Fitted Douglas Fir Entrance Doors," U. S. Department of Commerce, Commercial Standard CS91-41, Feb. 10, 1941.
Douglas Fir Doors, E. A. Nord Company, Specifications of Pacific Northwest Fir Doors, 3 pages, 1953.
Mercer, Henry C., Sc. D., "Ancient Carpenter's Tools," The Bucks County Historical Society, Doylestown, PA, p. 131-133, 1960.
Architectural Woodwork Quality Standards, Guide Specifications and Quality Certification Program, Fifth Edition, The Architectural Woodwork Institute, p. 109.
Lloyd, William B., Millwork Principles and Practices, Manufacture-Distribution-Use, Cahners Publishing Company, Inc., Chicago, IL., in assoc. with The National Woodwork Manufacturers Association, Inc., Table of Contents, pp. 192, 241, 116-117, 167, 173 © 1966.
Feirer, John L., Cabinetmaking and Millwork, Chas A. Bennett Co., Inc., Peoria, IL., pp. 4, 8-14, 145-146, 596-597, 684-687, © 1967. 1970.
A recorded voluntary standard of the trade published by the U. S. Dept. of Commerce, Commercial Standard CS73-61, Old Growth Douglas Fir, Sitka Spruce and Western Hemlock Doors, 3 pgs., effective Mar. 20, 1961.
1981 Sweet's Catalogue, Section 8-3/50, p. 7.
Hechinger Brochure—dated Mar. 16, 1986.
Masonite Brand Door Facings—brochure, published in 1987.
Elite Doors—brochure, apparently published in Oct. 1987.
Quality Doors Brochure © 1988.
"The New Mission Series" product brochure by Nord, Part of the JELD-WEN family, 300 W. Marine View Drive, Everett, WA 98201-1030, in existence at least as of Oct. 29, 2002.
1981 Sweet's Catalogue, Section 9.31/MO, p. 3, door in center of page.
VISADOR Brochure, date unknown.
Sauerland Spanplatte Website.
Wood Prodcuts Industry "10.5 Plywood Manufacturing" web site at http://www.epa.gov/ttn/chief/ap42/ch10/final/c10s05.pdf—Jan. 2002.
Wood Products Industry "10.6.2 Particleboard Manufacturing" web site at http://www.epa.gov/tnn/chief/ap42/ch10/final/c10s06-2.pdf—Jun. 2002.
Canadian Plywood Association "Plywood Manufacturing Process" web site at http://www.canply.org/English/products/manufacturing/manufacture.htm—Feb. 22, 2005.
Forestry Insights "Veneer Products" web site at http://www.insights.co.nz/products_processes_vp.aspx—Feb. 22, 2005.
OSB Guide "OSB Manufacturing Process" web site at http://www.osbguide.com/manufacturing.html—Feb. 22, 2005.
Oriented Strand Board "The Process of Producing Oriented Strand Board" web site at http://www.sres.anu.edu.au/associated/fpt/osb/Process.html—Feb. 16, 2005.
Article from PanelWorld, Sep. 2006, entitled Gutex Operation Implements New Process in Wood-Fiber Insulating Board Plant.
DeFosse, Matthew, "Processors focus on differentiation in window profiles", Sep. 1999, pp. 74-76, 78-79.
TimberTech, an Engineered Composite website, "TimberTech® Custom Extruded Profiles. You'll never find wood this good.", http://www.timbertech.com/profiles.html Feb. 18, 2000 (3 pages).
TimberTech, an Engineered Composite website, "Other TimberTech® Building Products", http://www.timbertech.com/profiles.html Feb. 18, 2000 (3 pages).
CranePlastics® website, "TimberTech® Profiles In Action", http://www.crane-plastics.com/custom_act_tt.html Feb. 18, 2000 (2 pages).
PCT International Search Report and Written Opinion, completed Jul. 5, 2008, mailed Jul. 14, 2008, PCT/US08/54298, International Filing date Feb. 19, 2008, JELD-WEN, inc.

* cited by examiner

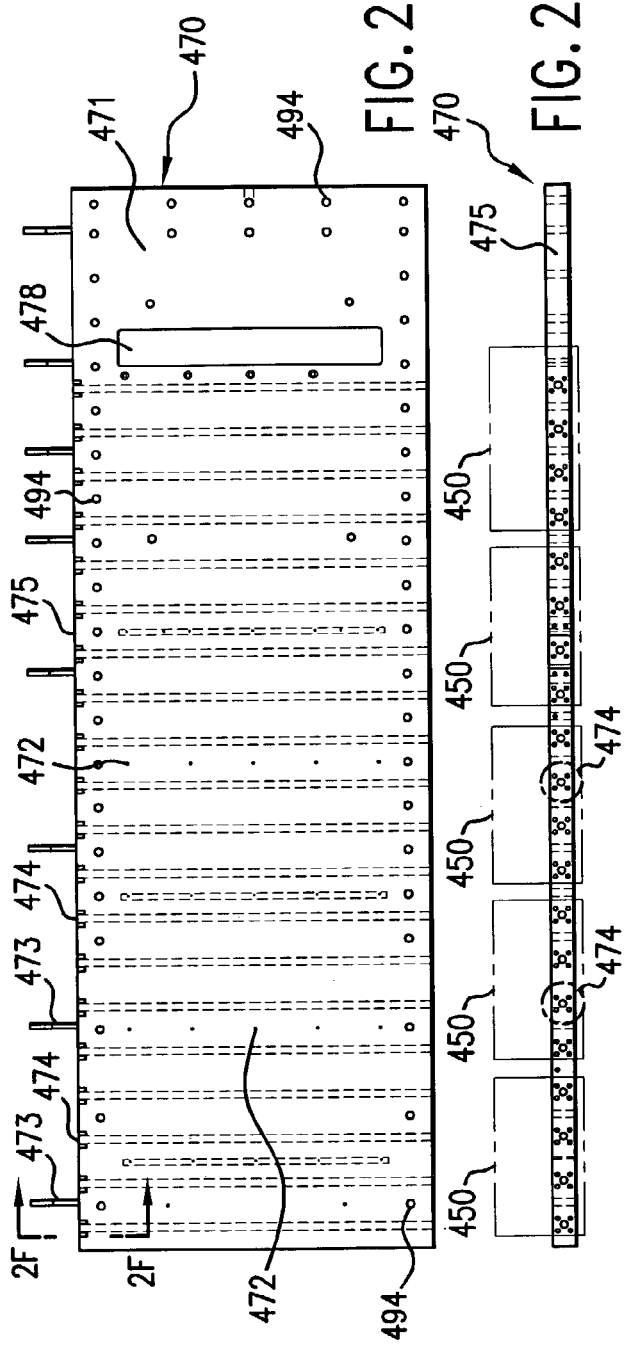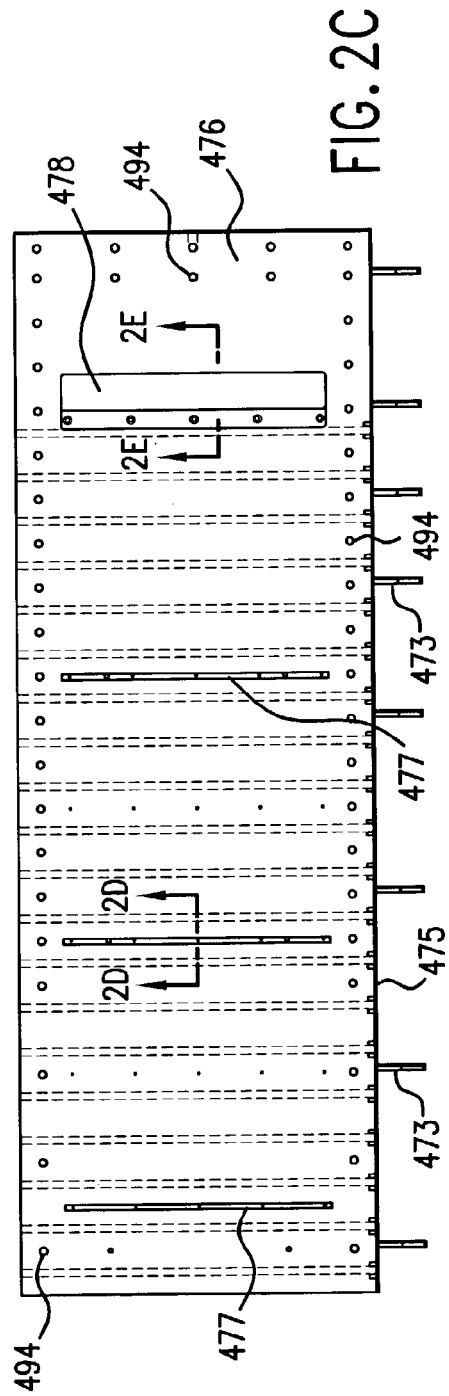

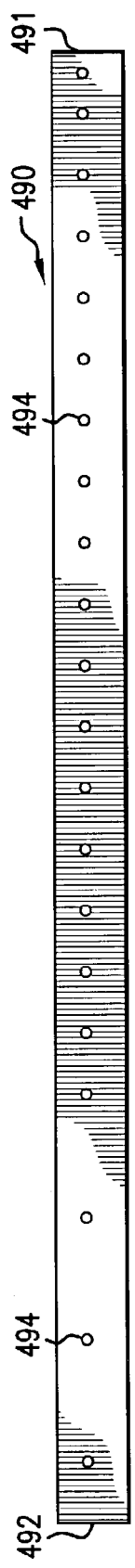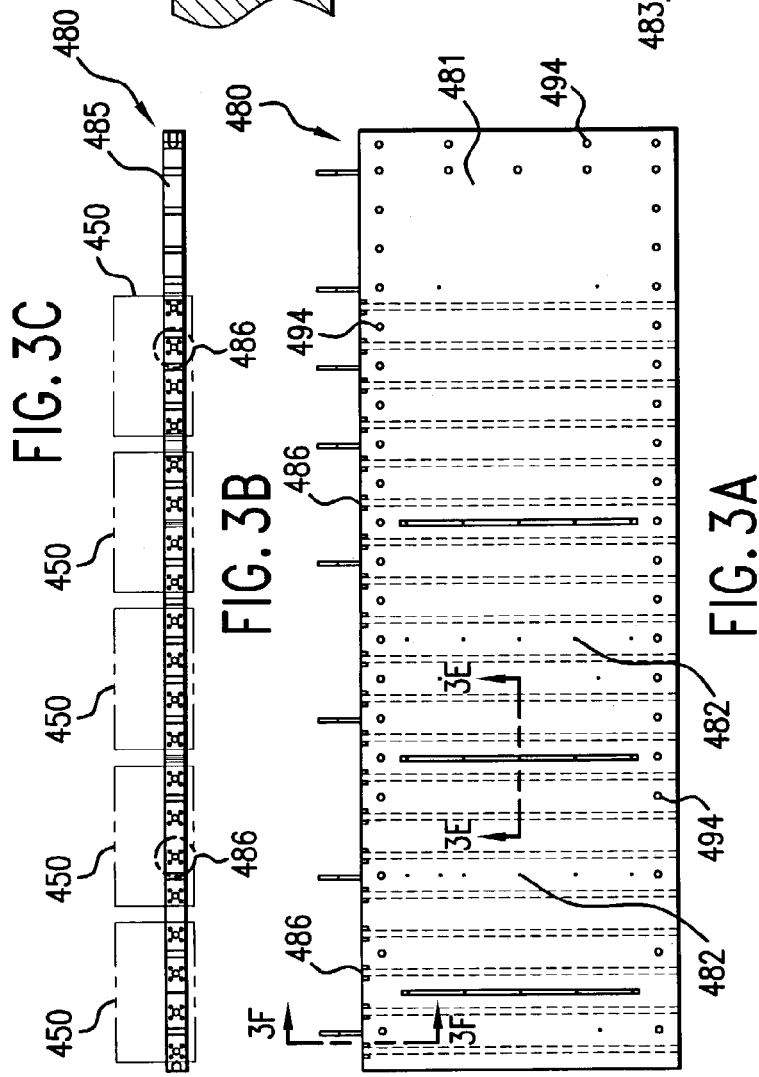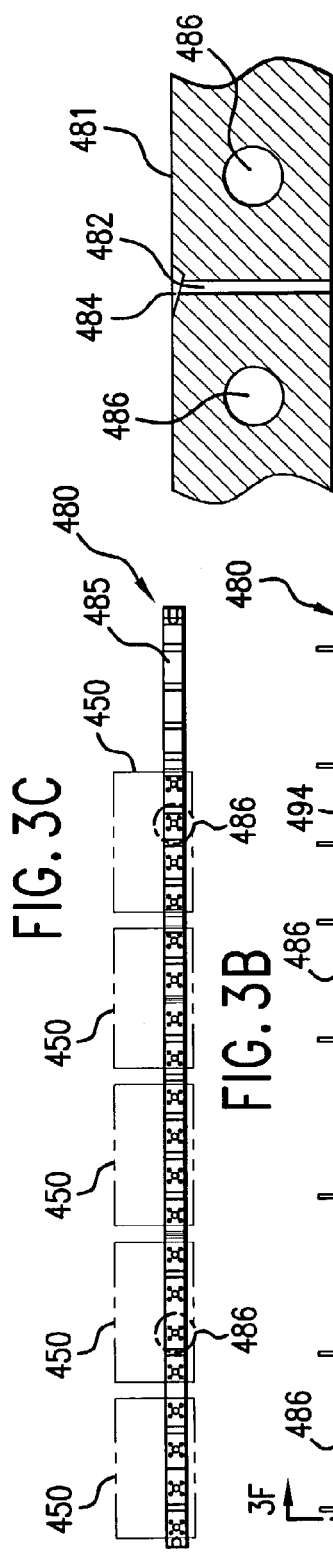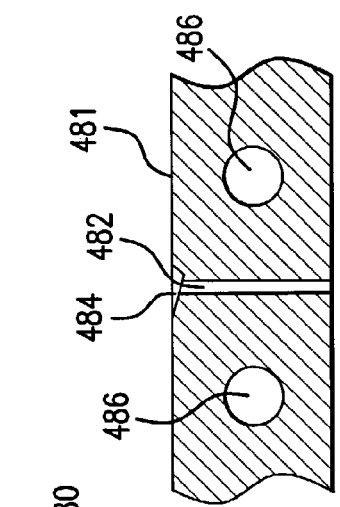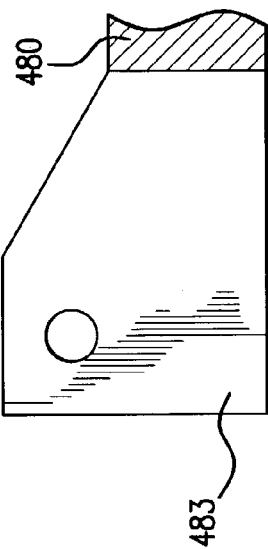
FIG. 3D
FIG. 3E
FIG. 3F
FIG. 3C
FIG. 3B
FIG. 3A

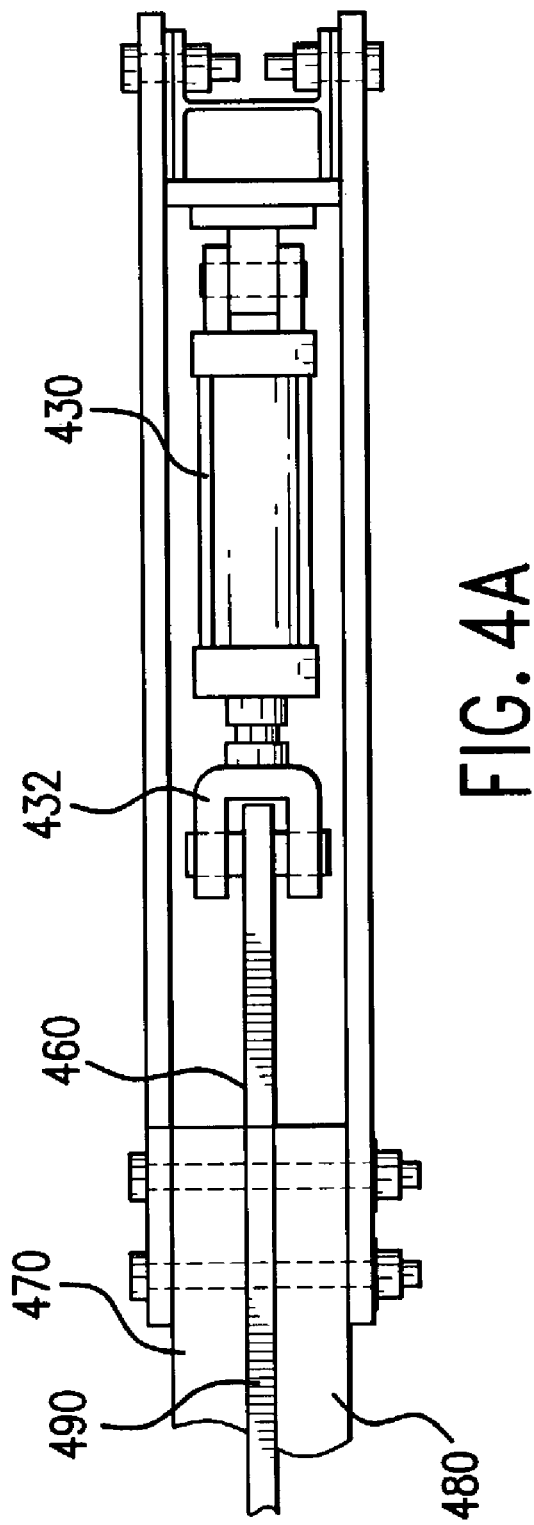
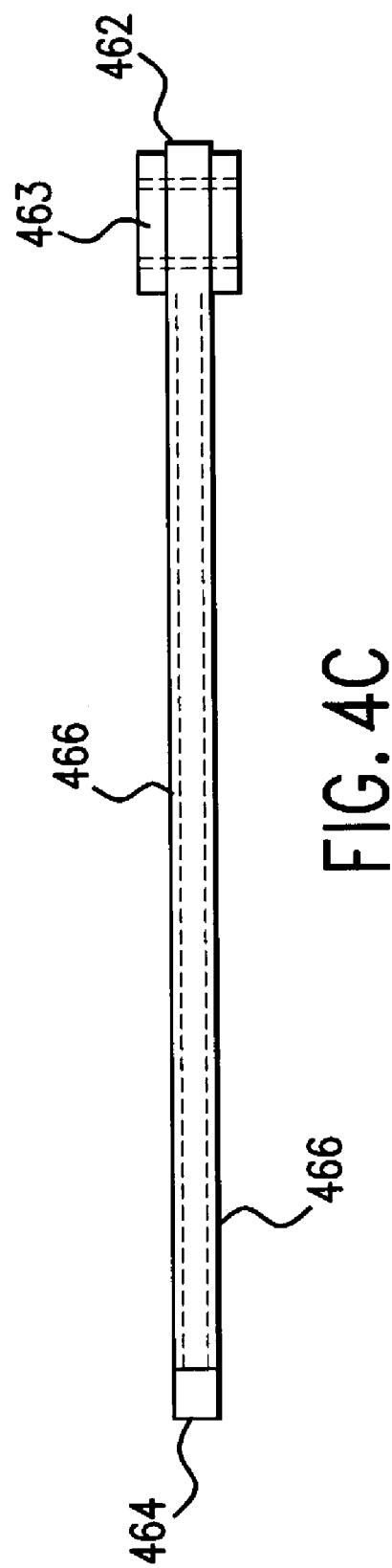

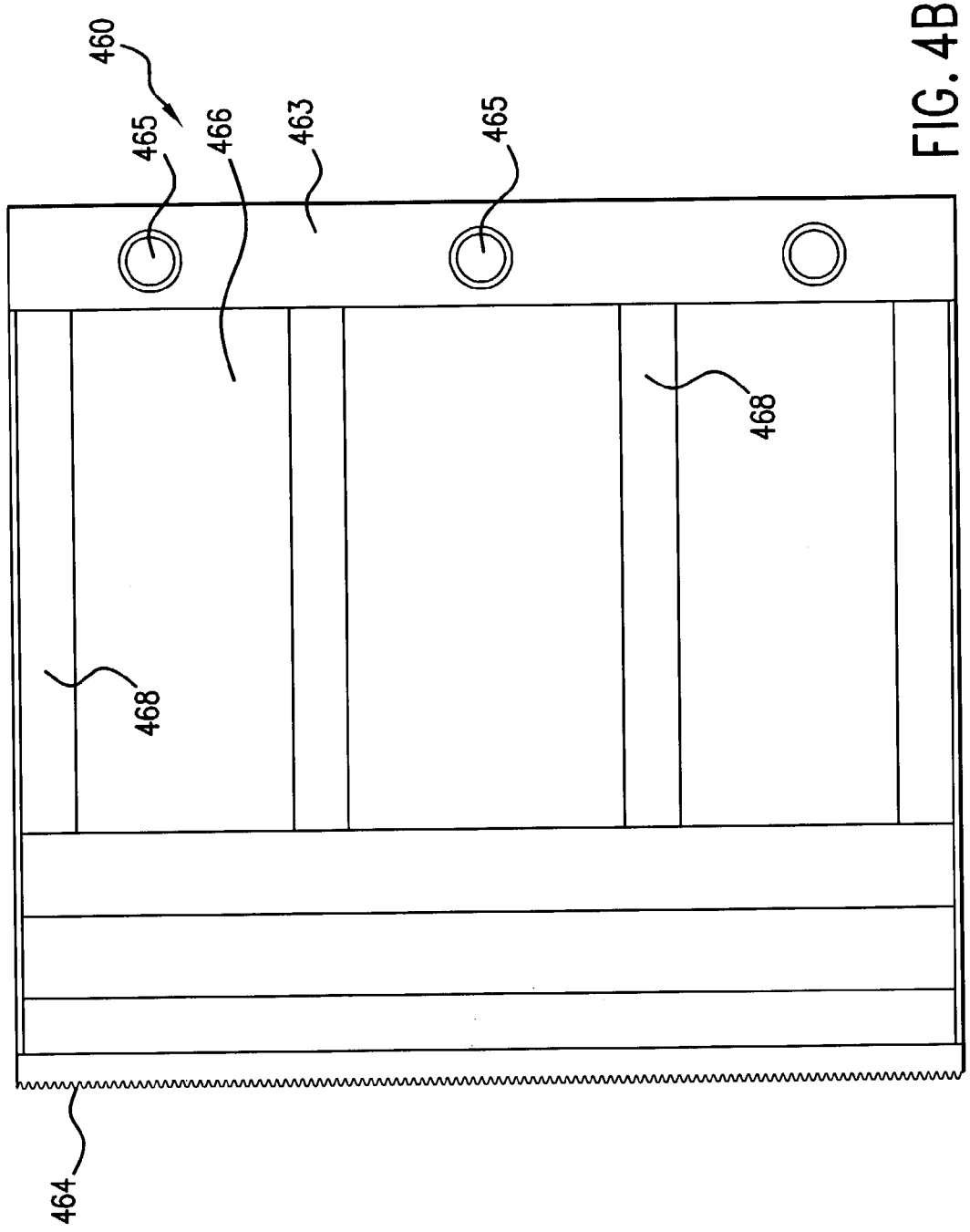

SYSTEM AND METHOD FOR MAKING EXTRUDED, COMPOSITE MATERIAL

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF INVENTION

The invention disclosed herein relates to composite materials in general, and more particularly, to an apparatus for and method of making an extruded, cellulosic-based composite material.

BACKGROUND

Manufacturing processes invariably result in material waste for a variety of reasons, such as imperfections in raw materials and errors made during production. Material waste has increasingly become an economic burden for manufacturers of wood products, such as doors and windows. In the past, wood waste from doors, cardboard, particleboard, and wood pallets was either disposed of in landfills or burned. The steady increase in fees for landfill disposal and increasingly stringent air-quality regulations have made traditional methods of waste disposal problematic for manufacturers of wood products.

Conventional alternatives to landfill disposal and burning are inadequate. One alternative is to place any one of a variety of pollution-control devices in the exhaust path of a wood-burning plant. However, the cost of such devices is expensive, and for small manufacturers, these expenses can quickly become cost-prohibitive. The cost of burning waste can also include governmental permit fees, as well as the cost of ensuring compliance with environmental regulations.

An alternative to disposing of the waste is to find another market for the waste material. One potential market is animal bedding. However, animal bedding requires generally homogenous and nontoxic material. Wood waste from manufacturing processes can often include ferrous materials and painted products, which can be harmful to animals. Thus, animal bedding is often not an adequate solution. Another potential market is fill material for construction sites. The construction industry utilizes fill for a variety of purposes, such as raising elevations. However, the demand for fill material is inconsistent, which means that manufacturers would be forced to keep an inventory of waste when there is no adequate demand. Keeping any sort of inventory is generally expensive, and thus, this option does not offer sufficient economic advantages over disposal.

Another alternative to disposing of wood waste is to utilize the wood waste to manufacture composite components. Various methods for utilizing wood waste to make certain wood-based composite materials, such as certain particleboards and fiberboards, is well known in the art. However, the equipment currently available to manufacture such composite materials is relatively expensive, and therefore is cost-prohibitive for most small and specialty manufacturers. Moreover, currently-available wood extrusion processes require generally uniform—that is, size, shape, weight, moisture content, and material type—raw materials. Often, wood waste from manufacturing processes is not uniform. Moreover, the product produced by such conventional methods typically has a density that is non-uniform.

SUMMARY OF THE INVENTION

The present invention includes systems and methods for making extruded composite material, and products made therefrom. One embodiment of the present invention provides for a method of making a material composition that includes mixing a thermoset polymer, a petroleum distillate, a release agent, and a catalyst to form an admixture. Preferably, the thermoset polymer is present in the furnish in an amount of approximately 6 to approximately 10 percent by weight. The method also includes mixing the admixture with a cellulosic material to form a generally homogenous furnish.

Another embodiment of the method includes introducing the furnish into a die having a length. The method further includes heating the furnish in the die to a temperature of at least 212 degrees F., forming water vapor in the furnish, and releasing the water vapor from the furnish and the die.

One embodiment of the present invention provides an apparatus for forming a continuous cellulosic-based composite material that includes a mixing chamber, a feeding chamber, and a die. The mixing chamber includes a volume and at least one entrance and one exit. The feeding chamber includes a volume, an entrance, and an exit. The entrance of the feeding chamber is in fluid communication with the exit of the mixing chamber.

The die includes an entrance, an exit, a piston, a ram, and a pressing chamber. The entrance of the die is in fluid communication with the exit of the feeding chamber. The pressing chamber has a volume formed by first and second platens. The first and second platens are in facing opposition to one another and have a length extending continuously from at least the entrance of the die to the exit of the die. The first and second platens have a plurality of orifices and heating elements disposed along the length. The first and second platens are disposed in first and second positions. The first position forms a first volume and the second position forms a second volume.

One embodiment of the present invention provides a material composition that includes a cellulosic material, a thermoset polymer being present in the composition in an amount of approximately 6 to approximately 10 percent by weight, a petroleum distillate, a release agent, and a catalyst. The composition has a generally uniform density. In an embodiment, the cellulosic material includes discrete wood particles having a diameter of less than approximately one-eighth-of-an-inch. In another embodiment, the cellulosic material includes discrete wood particles having a diameter of less than approximately three-eighths of an inch. The cellulosic material is present in the composition in an amount of approximately 83 to approximately 93.5 percent by weight. In an embodiment, the thermoset polymer is a melamine urea formaldehyde resin. The petroleum distillate is present in the composition in an amount of approximately 0 to approximately 2 percent by weight. The release agent can be present in the composition in an amount of approximately 0.03 to approximately 0.5 percent by weight. The catalyst can be present in the composition in an amount of approximately 0.5 to approximately 3 percent by weight In an embodiment, the composition has a density in a range between approximately 27 and approximately 36 pounds per cubic foot (pcf).

An advantage of the present invention can be to provide a homogenous composite material composition.

One advantage of the present invention can be to utilize non-uniform raw waste materials for the composite material composition.

An advantage of the present invention can be to reduce the amount of waste disposed of in landfills or burned by using waste wood to form a composite material.

Another advantage of the present invention can be to provide a uniform, high density composite material composition.

Yet another advantage of the present invention can be to provide composite material composition that is an effective sound barrier.

A further advantage of the present invention can be to provide an inexpensive apparatus for manufacturing a composite material composition.

Yet a further advantage of the present invention can be to provide for drying a composite admixture integral to the apparatus.

Another advantage of the present invention can be to use the material for components in hollow-core wood doors.

Additional advantages of embodiments of the invention are set forth in the detailed description that follows and will become more apparent to those skilled in the art upon examination of the following.

BRIEF DESCRIPTION OF THE DRAWINGS

The accompanying drawings, which are incorporated herein and constitute part of this specification, assist in illustrating embodiments of the invention.

FIG. 2A is a top plan view of a first platen of the apparatus of FIG. 1.

FIG. 2B is a side view of the first platen of the apparatus of FIG. 1.

FIG. 2C is a bottom plan view of the first platen of the apparatus of FIG. 1.

FIG. 3A is a top plan view of a second platen of the apparatus of FIG. 1.

FIG. 3B is a side view of the second platen of the apparatus of FIG. 1.

FIG. 3C is a side view of a platen spacer of the apparatus of FIG. 1.

FIG. 3D is a top plan view of the platen spacer of the apparatus of FIG. 1.

FIG. 3E is a cross-sectional view at line 3E-3E in FIG. 3A.

FIG. 3F is a cross-sectional view at line 3F-3F in FIG. 3A.

FIG. 4A is a side view of a ram and cylinder assembly of the apparatus of FIG. 1.

FIG. 4B is a side view of the ram of the apparatus of FIG. 1.

FIG. 4C is another side view of the ram of the apparatus of FIG. 1.

DETAILED DESCRIPTION

Figure 1:
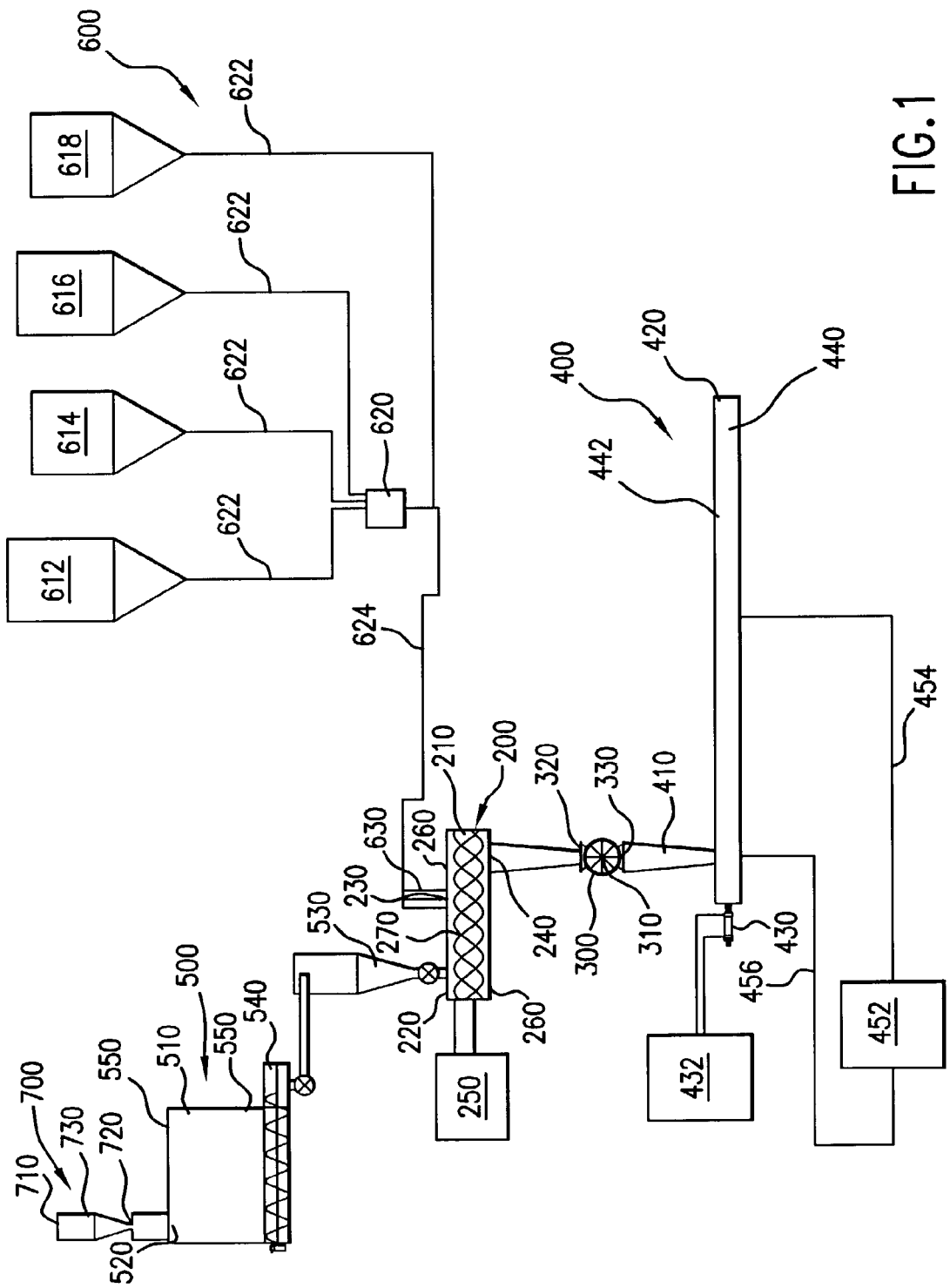
FIG. 1 is a schematic of an apparatus for forming a continuous cellulosic-based composite material according to an embodiment of the invention.

The present invention includes systems and methods for making extruded composite material, and products made therefrom. FIG. 1 shows one embodiment of a system for making extruded composite material according to the present invention. Referring to FIG. 1, a schematic of an apparatus 100 for forming a continuous cellulosic-based composite material according to an embodiment of the invention is shown. The apparatus 100 shown includes a mixing chamber 200, a feeding chamber 300, and a die 400. The mixing chamber 200 includes a volume 210, a first entrance 220, a second entrance 230, an exit 240, and an auger 270. A homogenous furnish (not shown), which includes a cellulosic material (not shown) and an admixture (not shown), is formed in the volume 210 of the mixing chamber 200. The admixture includes a thermoset polymer, a petroleum distillate, a release agent, and a catalyst. Alternatively, any suitable thermoset polymer, petroleum distillate, release agent, and catalyst can be used.

The volume 210 of the mixing chamber 200 is formed by a plurality of mixing chamber walls 260. The auger 270 is disposed proximate the exit 240 of the mixing chamber 200. The auger 270 forms the homogenous furnish by blending the cellulosic material and the admixture, i.e., directly contacting the cellulosic material and the admixture. The mixing chamber 200 includes a chiller 250. Preferably the chiller 250 is disposed separate from the volume 210 of the mixing chamber 200. Alternatively, the chiller 250 can be formed integrally with the volume 210 of the mixing chamber 200.

The feeding chamber 300 includes a volume 310, an entrance 320, and an exit 330. The entrance 320 of the feeding chamber 300 is in fluid communication with the exit 240 of the mixing chamber 200. The auger 270 mechanically conveys the homogenous furnish through the mixing chamber 200 to the exit 240 of the mixing chamber. The furnish is gravity-fed to the entrance 320 of the feeding chamber 300. Alternatively, any other suitable conveying means can be used.

The die 400 includes a input chute 410, an output channel 420, a piston 430, a ram 460, and a pressing chamber 440. The pressing chamber 440 has a volume 442. The volume 442 of the pressing chamber 440 is formed by a first platen 470 and a second platen 480. Alternatively, there can be more than two platens. The first platen 470 and the second platen 480 are in facing opposition to one another and each have a length extending continuously from at least the input chute 410 to the output channel 420. In one embodiment, the length of the first platen 470 and the second platen 480 is 12 feet. Alternatively, the platens 470 and 480 can be formed of a series of smaller plates disposed along a length of the pressing chamber 440. Preferably, the first platen 470 and the second platen 480 are formed of ASTM A36 steel plate. Alternatively, the first platen 470 and the second platen 480 can be formed of any other suitable grade of steel.

Referring now to FIG. 2A, a top view of the first platen 470 is shown. In one embodiment, the first platen 470 is 12 feet long, four feet wide, and three inches thick. Alternatively, any other suitable dimensions can be used. The first platen 470 includes a top surface 471. Disposed throughout the top surface 471 is a plurality of orifices 472. The orifices 472 are formed through the entire thickness of the first platen 470. Preferably, the orifices 472 are formed by drilling through the first platen 470. Alternatively, the orifices 472 can be molded in the first platen 470. A diameter of the orifices 472 are in a range between 0.30 inches and 0.60 inches. The orifices 472 permit vapor to escape the die 400 through the first platen 470. Disposed substantially along a perimeter as a plurality of bolt holes 494.

Figure 2E:
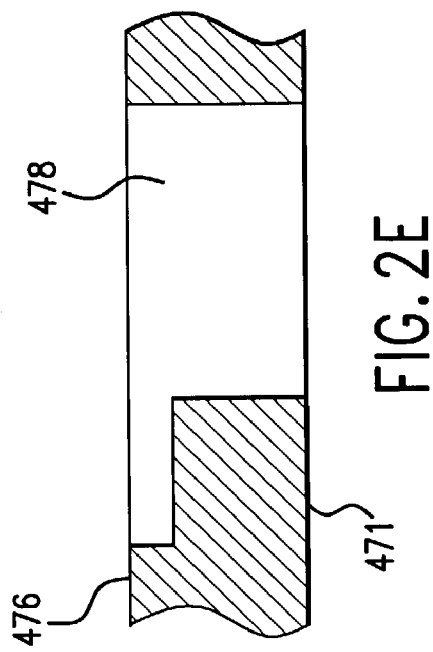
FIG. 2E is a cross-sectional view at line 2E-2E in FIG. 2C.
Figure 2D:
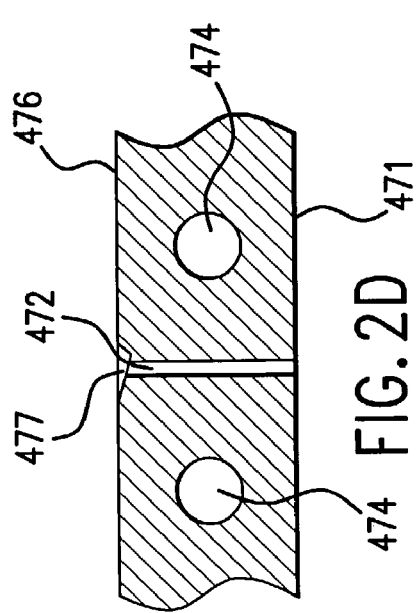
FIG. 2D is a cross-sectional view at line 2D-2D in FIG. 2C.
Figure 2F:
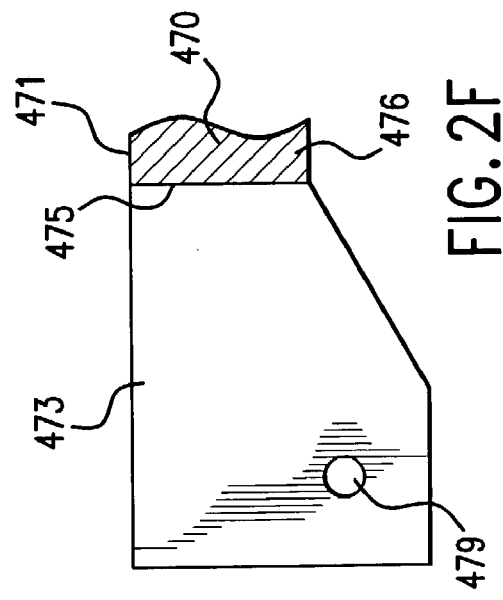
FIG. 2F is a cross-sectional view at line 2F-2F in FIG. 2A.

Disposed along a side surface of the first platen 470 is a plurality of hinges 473. Preferably, the hinge 473 is welded to the side surface of the first platen 470. Alternatively, the hinge 473 can be attached by fastening or the hinge 473 can be formed integrally with the first platen 470. FIG. 2F shows a side view of one of the hinges 473 in a cross-sectional view of the first platen 470 taken at line 2F-2F in FIG. 2A.

In an embodiment, the hinge 473 projects six-and-one-half inches from the side surface of the first platen 470. The thickness of each of the hinges 473 is three-quarters of an inch. The hinges 473 are generally flush with the top surface 471 of the first platen 470. An attaching orifice 479 is formed in a lower portion of each of the hinges 473. A diameter of the attaching orifice 479 is preferably eleven-sixteenths of an inch.

Referring now to FIG. 2B, a side view of the first platen 470 is shown. The first platen 470 includes a plurality of match drilled holes 474. As shown in FIG. 2B, the match drilled holes 474 are drilled into a side surface 475 of the first platen 470. The match drilled holes 475 are formed by a series of four minor diameters forming a square-like shape and a major diameter disposed in a center of the square. Preferably, the plurality of match drilled holes 474 is 20. The major diameter of each of the match drilled holes 474 is drilled entirely from the side surface 475 to an opposite side surface (not shown). In an embodiment, the major diameter of the match drilled holes 474 is one inch and the minor diameters of the match drilled holes 474 are one-half an inch. Alternatively, any other suitable dimensions can be used for the major and minor diameters of the match drilled holes 474. The match drilled holes 474 supply hot oil to the first platen 470 to heat the furnish in the die 400 (described in more detail below).

Referring now to FIG. 2C, a bottom view of the first platen 470 is shown. The first platen 470 includes a bottom surface 476. Disposed along the bottom surface 476 of the first platen 470 are a plurality of grooves 477. The grooves 477 are disposed substantially parallel to one another and extend nearly the entire distance from the side surface 475 to the opposite side surface. Preferably, the grooves 477 can be machined into the bottom surface. Alternatively, the grooves 477 can be etched or molded in the bottom surface 476. Disposed within the grooves 477 are the orifices 472. Referring now to FIG. 2D, a cross-sectional view taken along line 2D-2D in FIG. 2C shows a typical detail of the orifices 472. The orifice 472 shown in FIG. 2D extends through the first platen 470 from the top surface 471 to the bottom surface 476.

In one embodiment, an infeed 478 is disposed in the top surface 471. The infeed 478 is generally rectangular in shape and extends substantially from the side surface 475 to the opposite side surface. A cross-sectional view of the infeed 478 taken along line 2E-2E in FIG. 2C is shown in FIG. 2E. The infeed 478 extends through the entire thickness of the first platen 470. Preferably, a width of the steam vent 478 is five inches. Alternatively, any other shape and dimensions can be used. The infeed 478 allows furnish to enter the die 400.

Referring now to FIG. 3A, a top view of the second platen 480 is shown. In one embodiment, the second platen 480 is 12 feet long, four feet wide, and three inches thick. Alternatively, any other suitable dimensions can be used. The second platen 480 includes a top surface 481. Disposed throughout the top surface 481 is a plurality of orifices 482. The orifices 482 are formed through the entire thickness of the second platen 480. Preferably, the diameter of the orifices 482 are in a range between 0.30 inches and 0.60 inches. A cross section of the second platen 480 taken along line 3E-3E in FIG. 3A shows one of the orifices 482 in FIG. 3E. The orifices 482 permit vapor to escape the die 400 through the second platen 480. A plurality of grooves 484 are disposed along the bottom surface 481 of the second platen 480. The grooves 484 are disposed substantially parallel to one another and extend nearly the entire distance from a side surface 485 to an opposite side surface (not shown). The plurality of orifices 482 are disposed within the grooves 484. A plurality of hinges 483 are disposed along a side surface of the second platen 480. The details of the hinges 483 are materially similar to the hinges 473 and will not be described in detail. The hinges 483 are shown in FIG. 3F. The hinges 473 and 483 interlock to secure the first and second platens 470 and 480 together. The hinges 473 and 483 can be interlocked together by a nut and bolt or any other suitable securing means.

Referring now to FIG. 3B, a side view of the second platen 480 is shown. Preferably, the second platen 480 is three inches thick. The second platen 480 includes a plurality of match drilled holes 486. The match drilled holes 486 are drilled into the side surface 485 from the side surface 485 to the opposite side surface. The match drilled holes 486 supply hot oil to the second platen 480 to heat the furnish in the die 400 (described in more detail below). The structure of the match drilled holes 486 in the second platen 480 is similar in material respect to the match drilled holes 474 of the first platen 470, and thus will not be described in detail.

Referring now to FIGS. 3C and 3D, a platen spacer 490 is shown. Preferably, the length of the platen spacer 490 corresponds to the length of the first and second platens 470 and 480, i.e., 12 feet. Alternatively, the length of the platen spacer 490 can be different than the length of the first and second platens 470 and 480. A width of the platen spacer 490 is preferably six-and-seven-eighths inches. Alternatively, the width of the platen spacer 490 can be approximately six-and-seven-eighths inches or any other suitable thickness. In one embodiment, a thickness of the platen spacer 490 is tapered. At an end 492 of the platen spacer 490 proximate the output channel 420, the thickness is preferably 1.19 inches. At an end 491 of the platen spacer 490 proximate the infeed 478, the thickness is preferably 1.11 inches. In the embodiment, the thickness of the platen spacer 490 is 1.11 inches for six feet from end 491; the thickness of the spacer 490 then increases gradually to 1.19 inches over the next two feet, and remains at 1.19 inches to the end 492. Alternatively, any other suitable dimensions and configurations can be provided. For example, in another embodiment, the thickness of the platen spacer 490 at the end 492 can be 1.75 inches. In this other embodiment, the thickness of the platen spacer 490 can be 1.67 inches at the end 491 and for six feet from the end 491. Alternatively, the platen spacer 490 can be any other suitable thicknesses. The platen spacer 490 can also have a constant thickness along its entire length.

In an embodiment, the spacer 490 is disposed between the top surface 481 of the second platen 480 and the bottom surface 476 of the first platen 470. Preferably, a plurality of bolts (not shown) join the first platen 470, the second platen 480, and the spacer 490 through the plurality of bolt holes 494. As the spacer 490 is attached to the first and second platens 470 and 480, the first and second platens 470 and 480 conform to the spacer 490. Preferably, there are two spacers 490. One spacer 490 is disposed along side surfaces 475 and 485 and the opposite side surfaces. The spacers 490 also prevent furnish from escaping through sides of the die 400.

Preferably, the first and second platens 470 and 480 are separated by the spacer 490. Due to the taper of the spacer 490, the distances between the platens 470 and 480 vary, and thus, the volume 442 of the pressing chamber 440 varies as well. In a position proximate the input chute 410, the platens form a first volume (not shown) of the pressing chamber 440. In a second position proximate the output channel 420, the platens form a second volume (not shown) of the pressing chamber 440. The first volume is less than the second volume. Preferably, the minimum distance between the platens 470 and 480 is 1.11 inches—the thickness of the spacer 490 at end 491. Preferably, the maximum distance between the platens 470 and 480 is 1.19 inches—the thickness of the spacer 490 at end 492. Alternatively, any other suitable distances between the platens 470 and 480 can be provided. For example, the maximum distance between the first and second platens 470 and 480 can be 1.75 inches. This maximum distance between the platens 470 and 480 can be proximate the output channel 420. In another embodiment, the distance between the platens 470 and 480 can be uniform through the length of the pressing chamber 400. The furnish is compressed as it is displaced from the input chute 410 to the output channel 420.

The first and second platens 470 and 480 include a plurality of heating elements 450 disposed along the length of the first and second platens 470 and 480. Each heating element 450 is formed by a number of the plurality of match drilled holes 474 and 486. Preferably, each heating element 450 is formed by five of the match drilled holes 474 in the first platen 470 and five of the match drilled holes 486 in the second platen 480. Preferably, the heating elements 450 supply hot oil to the platens 470 and 480. Alternatively, the heating elements 450 can be formed of any suitable heating element, including electric resistance-type heaters. The preferably five heating elements 450 can be controlled with respect to temperature by increasing or decreasing the major diameter of the match drilled holes 474 and 486. As described above, the preferred major diameter is one inch. The heating element 450 proximate the infeed 478 is preferably maintained at a temperature in a range between approximately 340 degrees F. and approximately 360 degrees F. The heating element 450 proximate the output channel 420 is preferably maintained at a temperature in a range between approximately 360 degrees F. and 380 degrees F. The heating elements 450 between these two extremes are maintained at a temperature between the extremes of the temperature ranges described above. The heating elements 450 transfer sufficient heat to the homogenous furnish in the die 400 to vaporize water in the furnish, i.e., to at least 212 degrees F.

The heating elements 450 shown are provided with hot oil by a hot oil pump 452. The hot oil pump 452 preferably includes an integral hot oil reservoir (not shown) and an integral hot oil heater (not shown). Alternatively, the hot oil pump 452 can be connected to a stand-alone (i.e., separate) hot oil reservoir (not shown) and a stand-alone hot oil heater (not shown). A feed line 454 transports the hot oil to the heating elements 450 and a return line 456 transports cooled oil to the pump 452 for re-heating and subsequent recirculation.

In an embodiment shown in FIG. 1, the piston 430 is disposed proximate the input chute 410 and opposite the output channel 420. The piston 430 is positioned substantially perpendicular to the input chute 410. Preferably, the piston 430 is powered by a hydraulic oil pump 432. Alternatively, the piston 430 can be powered by any other suitable means, such as pneumatic or motorized means and exerts a force in the volume 442 of the pressing chamber 440 in a generally planar direction from the input chute 410 toward the output channel 420. The force of the piston 430 is preferably in a range between approximately 1000 pounds per square inch (psi) and 2500 psi. The force of the piston 430 displaces the furnish toward the output channel 420. Preferably, the piston 430 cycles 15 times per minute.

Referring now to FIG. 4A, a detail of an embodiment of the piston 430 is shown. The piston 430 is connected to a ram 460. Preferably, the piston 430 is connected to the ram 460 by a clevis 432. Alternatively, any other suitable connecting means can be provided. Referring now to FIG. 4B, a side view of the ram 460 is shown. In the embodiment shown in FIG. 4B, the ram 460 is approximately 32 inches by approximately 34 inches. Alternatively, other suitable dimensions can be used. The ram includes an end 462 and a serrated face 464. Preferably, the serrated face 464 is approximately 1.1 inches by approximately 34 inches. Alternatively, any other suitable dimensions can be used. Disposed between the end 462 and the serrated face 464 is a body 466. The body 466 includes a plurality of wear strips 468. In one embodiment, several wear strips 468 are disposed proximate the serrated face 464. Several other wear strips 468 are disposed perpendicular to the end 462 and the serrated face 464. The wear strips can be attached to the face by a plurality of fasteners (not shown). Preferably, the serrated face 464 forms a jagged surface. Alternatively, the serrated face 464 can be a generally smooth surface.

Referring now to FIG. 4C, another side view of the ram 460 is shown. In an embodiment shown in FIG. 4C, the end 462 is formed of two plates 463. The two plates 463 are joined to the body 466. The two plates 463 can be joined to the body 466 by welding or by fastening. Alternatively, the two plates 463 can be formed integrally with the body 466. The thickness of the end 462 is preferably two-and-one-half inches. The thickness of the body is approximately 1.1 inches. A plurality of bushings 465 are formed or drilled through the entire thickness of the end 462. Preferably, an inner diameter of the bushings 465 is one-and-three-quarters inch and an outer diameter of the bushings 465 is two-and-one-quarter inches. Alternatively, any other suitable diameters can be provided. The plurality of bushings 465 provide a means of attachment for the clevis 432 to couple the piston 430 and the ram 460. Thus, the force of the piston 430 is transferred to the ram 460.

The ram 460 displaces the furnish in the pressing chamber 400. The pressing chamber is formed by the first platen 470, the second platen 480, and the platen spacer 490. The movement of the furnish through the pressing chamber compresses the furnish to a predetermined density. Preferably, the density of the furnish is in a range between 27 and 36 pcf. Preferably, the ram 460 displaces the furnish through the die at a rate of 990 pounds per hour. Alternatively, any other suitable rate can be used.

An embodiment of the apparatus also includes a hopper 500 and a resin injector 600. The hopper 500 includes a volume 510, an entrance 520, an exit 530, and a screw feeder 540. The volume 510 of the hopper 500 is formed by a plurality of hopper walls 550 and holds the cellulosic material. The screw feeder 540 is disposed proximate the exit 530 of the hopper 500. The exit 530 of the hopper 500 is in fluid communication with the first entrance 220 of the mixing chamber 200. The screw feeder 540 continuously introduces the cellulosic material from the exit 530 of the hopper 500 to the first entrance 220 of the mixing chamber 200 at a rate in a range between approximately 800 and approximately 1300 pounds per hour. Alternatively, a faster or slower rate can be used.

An embodiment of the hopper 500 also includes a screen (not shown) disposed in an upper portion of the hopper 500 between the entrance 520 of the hopper and the screw feeder 540. Thus, the screen separates the entrance 520 of the hopper 500 and the exit 530 of the hopper. Most preferably, the screen is one-eighth-of-an-inch thick. Preferably, the screen is three-eighths-of-an-inch thick. Alternatively, any other suitable thickness can be used for the screen. A plurality of orifices (not shown) is disposed in the screen. Most preferably, a diameter of each of the orifices is one-eighth-of-an-inch, also known as U.S. mesh #6. Preferably, the diameter of each of the orifices is three-eighths-of-an-inch. Alternatively, any suitable diameter can be provided. Thus, the screen prevents cellulosic material having a diameter greater than or equal to the screen orifice diameter from passing through the exit 530 of the hopper 500.

The resin injector 600 includes a plurality of tanks 610 holding the admixture. The tanks 610 include a thermoset polymer tank 612, a release agent tank 614, a petroleum distillate tank 616, and a catalyst tank 618. Preferably a capacity of the thermoset tank 612 is 3,000 gallons, a capacity of the release agent tank 614 is 250 gallons, a capacity of the petroleum distillate tank 616 is 1,000 gallons, and a capacity of the catalyst tank is 250 gallons. Alternatively, any suitable number, capacities, and configurations of tanks can be provided.

The resin injector 600 also includes a resin valve 630. The resin valve 630 is in fluid communication with and can be disposed proximate the second entrance 230 of the mixing chamber 200. The resin valve 630 regulates the flow of the admixture from the tanks 610 into the mixing chamber 200. Preferably, the admixture enters the mixing chamber 200 at a rate in a range between 0.15 and 0.35 gallons per minute. Alternatively, the admixture can enter the mixing chamber 200 at any other suitable rate. The admixture is sprayed onto the cellulosic material in the volume 210 of the mixing chamber 200. Preferably, prior to entering the mixing chamber 200, the thermoset resin, the release agent, and the petroleum distillate are mixed in a mixing tank 620 forming a blend. Alternatively, the thermoset resin, release agent, and petroleum distillate can be mixed together after being introduced into the mixing chamber 200.

A plurality of tank lines 622 provide pathways from the plurality of tanks 610 to the mixing tank 620. Most preferably, the thermoset polymer flows from tank 612 through tank line 622 to the mixing tank 620 at a rate of 131 pounds per hour. Most preferably, the release agent flows from tank 614 through tank line 622 to the mixing tank 620 at a rate in a range between one and ten pounds per hour. In one embodiment, the release agent flow rate can be 3.5 pounds per hour. Most preferably, the petroleum distillate flows from tank 616 through tank line 622 at a rate of 16 pounds per hour. Most preferably, the release agent flows from the tank 618 through tank line 622 at a rate of 4 pounds per hour. Alternatively, any other suitable flow rates can be used. Preferably, the blend flows from the mixing tank 620 and is combined with the catalyst from the catalyst tank 618 in a resin valve feed line 624 and forms the admixture. Alternatively, the catalyst can be added directly to the mixing chamber 200 through a separate injection port (not shown).

The embodiment shown also includes a cyclone 700. The cyclone 700 includes an entrance 710, an exit 720, and a middle portion 730. The middle portion 730 is disposed between the entrance 710 and the exit 720 of the cyclone 700. The middle portion 730 includes at least one magnet (not shown). The exit 720 of the cyclone 700 is in fluid communication with the entrance 520 of the hopper 500. Preferably, cellulosic material is introduced into the apparatus 100 through the entrance 710 of the cyclone 700. As the cellulosic material is directed from the entrance 710 through the middle portion 730 and to the exit 720 of the cyclone 700, the magnet removes ferrous material that is present in the cellulosic material. The process of making the cellulosic-based composite material will next be described.

Figure 5:
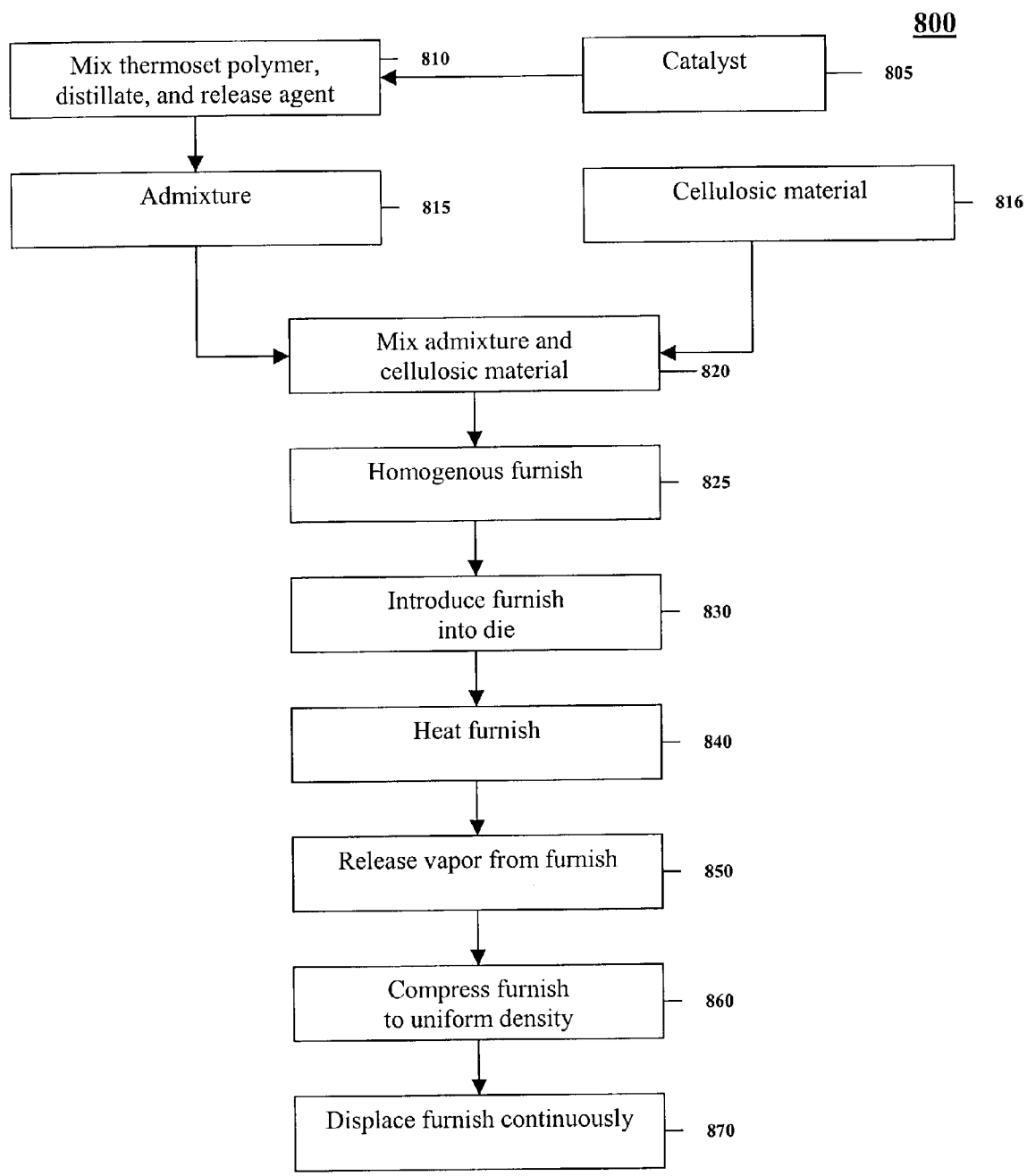
FIG. 5 is a flowchart of a process of using the apparatus in FIG. 1.

FIG. 5 shows a flowchart of a process of using the apparatus shown in FIG. 1 and described above. As indicated by blocks 805 and 810 in FIG. 5, the method of making a material composition shown preferably includes mixing a thermoset polymer, petroleum distillate, and a release agent, and with combining a catalyst to form an admixture 815. Alternatively, the catalyst can be combined with the cellulosic material directly. As indicated by block 820, the admixture 815 mixes with a cellulosic material 816 in the mixing chamber 200 to form a generally homogenous furnish 825. Most preferably, the thermoset is present in the furnish in an amount of 6 to 10 percent by weight. Preferably, the thermoset polymer is a melamine urea formaldehyde resin. A thermoset polymer is a polymer that does not melt when heated after initial hardening, in contrast to a thermoplastic polymer. Alternatively, any other suitable thermoset can be used. In one embodiment, the chiller 250 maintains the admixture and the cellulosic material at a temperature of 65 degrees F. In one embodiment, the petroleum distillate is preferably an emulsified wax. Alternatively, the petroleum distillate can be any other suitable emulsified wax. Most preferably, the release agent is a modified fatty oil commercially available from E.U.P. Wurtz GmbH & Co. (product No. PAT-2660). In one embodiment, the release agent is preferably a modified fatty oil. Release agents are also known as separators, parting agents, or parting compounds. Other release agents that can be used are emulsified waxes, montan waxes, and zinc sterates. Common release agents include soft liquids, such as soap, petroleum jelly, or thin oils. Alternatively, the release agent can be any other suitable lubricant commonly used in extrusion of wood and plastics. In one embodiment, the catalyst is ammonium chloride. Alternatively, the catalyst can be any other suitable catalyst, such as ammonium sulphate or aluminum sulphate.

In an embodiment, the cellulosic material most preferably includes discrete wood particles. Preferably, wood fiber is not used. Preferably, the cellulosic material can vary significantly in size, shape, weight, moisture content, and material type. Alternatively, the cellulosic material can be any other suitable plant-like material. Preferably, the source of the wood particles is from waste wood, including waste wood from manufacturing processes, e.g., manufacturing doors. Alternatively, the wood particles can be from any other suitable source. Preferably, a diameter of each of the wood particles is less than one-eighth-of-an-inch. Alternatively, the diameter of each of the wood particles can be less than three-eighths-of-an-inch.

In an embodiment, the cellulosic material preferably is present in the furnish in the amount of 83 to 93.5 percent by weight. The petroleum distillate is present in the furnish in the amount of 0 to 2 percent by weight. The release agent is present in the furnish in the amount of 0.03 to 0.5 percent by weight. The catalyst is present in the furnish in the amount of 0.5 to 3 percent by weight. Alternatively, any other suitable amounts for the above can be used.

In an embodiment, the input chute 410 of the die introduces the homogenous furnish 825 into a volume 442 of the die 400 as indicated by block 830. Preferably, the furnish is introduced into the die at a predetermined rate. Most preferably, the rate is 990 pounds per hour. In an embodiment, the homogenous furnish, as indicated by block 840, is heated to a temperature of at least 212 degrees F. Preferably, the heating elements 450 of the die 400 heat the furnish. Accordingly, the heat provided by the heating elements vaporizes water present in the furnish. In one embodiment, the water vapor is released from the homogenous furnish as indicated by block 850. The structure of the heating elements and the grooves and orifices allowing the release of the vapor in the platens is described in detail above. Preferably, any other suitable means for vapor release can be used.

In an embodiment, the die 400 compresses the homogenous furnish to a uniform density in the range between approximately 27 and approximately 36 pcf, as indicated by block 860. Most preferably, the homogenous furnish is compressed by the platens in the die 400. Alternatively, compressing the homogenous furnish can be performed by any other suitable means. In an embodiment, as indicated by block 870, the force of the piston 430 continuously displaces the homogenous furnish along the length of the die. Alternatively, the homogenous furnish can be displaced along the length of the die by any other suitable means. The composite material is thus formed continuously.

The continuously formed composite material can be further processed after it exits the output channel 420. For example, the composite material can be sanded, shaped, and cut as desired. The composite material can be used in a variety of applications, including those suitable for particleboard. For example, the composite material can be used in hollow-core or solid-core doors for lockblocks, rails, stiles, and the like.

Figure 6:
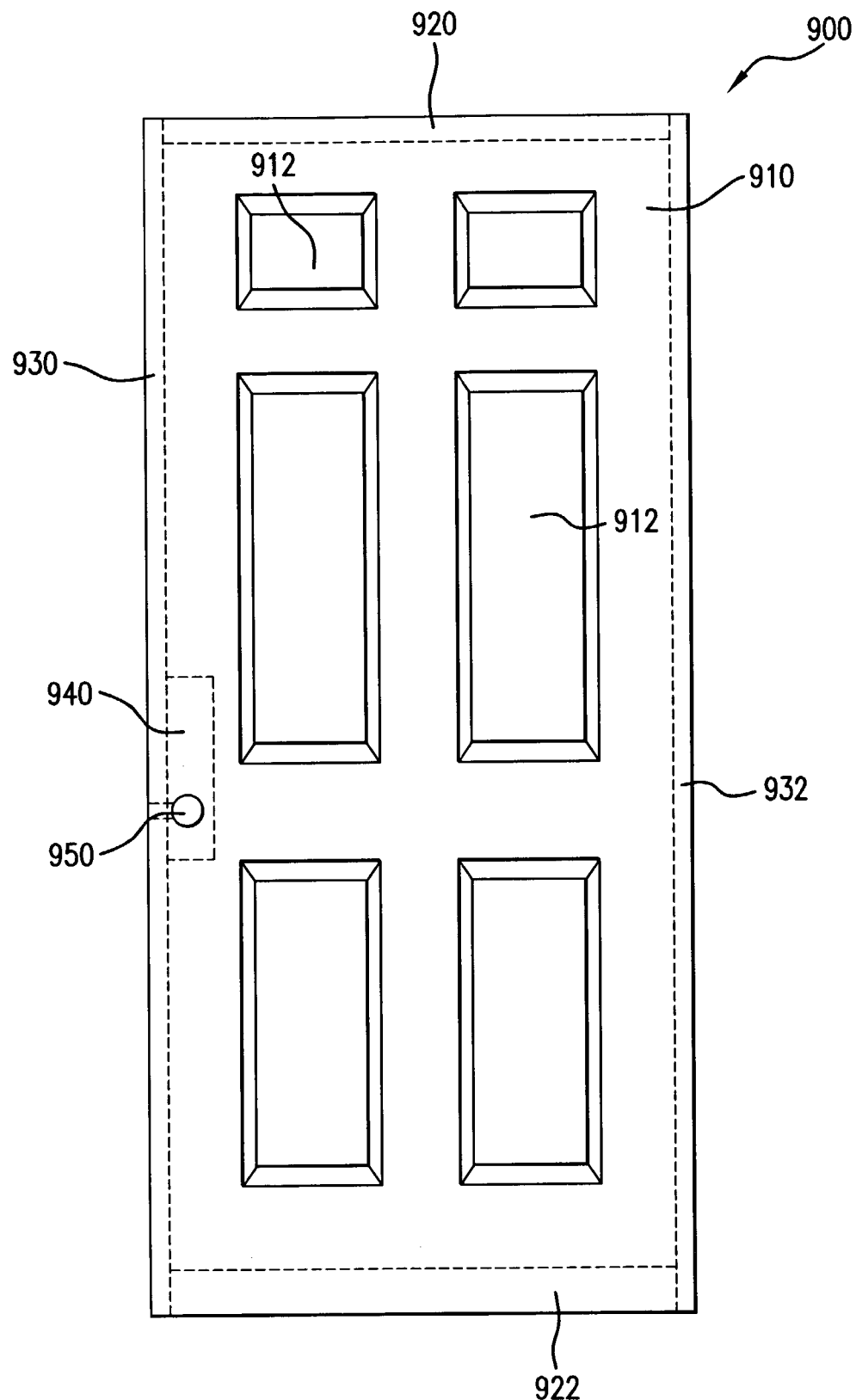
FIG. 6 is a front view of a door using the material composition produced by the process of FIG. 5.

An exemplary embodiment of an application for the composition described above is shown in FIG. 6. A hollow paneled door 900 includes a front-facing outer skin 910 with a series of molded panels 912 and a rear-facing outer skin (not shown). Preferably, the front-facing outer skin 910 and the rear-facing outer skin are adhered together by a top rail 920, a bottom rail 922, a latch stile 930, and a hinge stile 932, all of which are indicated in dotted line.

Also shown in dotted line is a lockblock 940. The lockblock 940 is produced by the apparatus and the method described above. Preferably, the lockblock 940 is adhered to the latch stile 930. Alternatively, the lockblock 940 can be joined to the latch stile 930 by any other suitable means, such as by using a threaded fastener. A through hole 950 for seating a latch set (not shown) extends through the front-facing outer skin 910 and the rear-facing outer skin and the lockblock 940. The lockblock 940 provides a surface for adhering the front-facing exterior skin 910 and the rear-facing exterior skin. The lockblock 940 further provides reinforcement for the latch set and the door 900. While dimensions for the lockblock 940 can vary, the preferred dimensions for the lockblock 940 are three inches by six-and-three-quarters of an inch by one-and-one-eighth of an inch. Alternatively, the dimensions of the lockblock can be three inches by sixteen inches by one-and-one-eighth of an inch.

Most preferably, the top rail 920, the bottom rail 922, the latch stile 930, the hinge stile 932, and the lockblock 940 are made of the disclosed composite material. Most preferably, the composite material is made in accordance with the disclosed system and method. Alternatively, any other suitable system and method can be used to produce the disclosed composite material for use in a hollow paneled door.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A material composition consisting essentially of:
 a continuous cellulosic material comprising a heterogeneous waste material;
 a thermoset polymer present in the composition in an amount of about 6 to about 10 percent by weight;
 a petroleum distillate;
 a release agent; and
 a catalyst,
 wherein the composition has a substantially uniform density.

2. The material composition according to claim 1, wherein the cellulosic material is present in the composition in an amount of about 83 to about 93.5 percent by weight.

3. The material composition according to claim 1, wherein the petroleum distillate is present in the composition in an amount of about 0 to about 2 percent by weight.

4. The material composition according to claim 1, wherein the release agent is present in the composition in an amount of about 0.03 to about 0.5 percent by weight.

5. The material composition according to claim 1, wherein the catalyst is present in the composition in an amount of about 0.5 to about 3percent by weight.

6. The material composition according to claim 1, wherein the thermoset polymer is comprised of a melamine urea formaldehyde resin.

7. The material composition according to claim 1, wherein the petroleum distillate is comprised of an emulsified wax.

8. The material composition according to claim 1, wherein the release agent is comprised of a modified fatty oil.

9. The material composition according to claim 1, wherein the catalyst is comprised of an ammonium chloride.

10. The material composition according to claim 1, wherein the density of the composition is between about 30 and about 36 pounds per cubic foot.

11. The material composition according to claim 1, wherein the cellulosic product is not a wood fiber.

12. The material composition according to claim 1, wherein the cellulosic material is comprised of discrete wood particles.

13. The material composition according to claim 12, wherein each of the discrete wood particles has a diameter of less than about one-eighth of an inch.

14. The material composition according to claim 12, wherein each of the discrete wood particles has a diameter of less than about three-eighths of an inch.

15. The material composition according to claim 12, wherein each of the discrete wood particles has a diameter of about one-eighth of an inch to about three-eighths of an inch.

16. An extruded material composition consisting essentially of:
 a continuous cellulosic material comprising a heterogenous waste material;
 a thermoset polymer present in the extruded composition in an amount of about 6to about 10 percent by weight;
 a petroleum distillate;
 a release agent; and
 a catalyst, wherein the extruded composition has a substantially uniform density.

17. An extruded material composition consisting essentially of:
 a continuous cellulosic material comprising a heterogenous waste material;
 a thermoset polymer present in the extruded composition in an amount of about 6 to about 10 percent by weight;
 a petroleum distillate;
 a release agent; and
 a catalyst, wherein the extruded composition has a substantially uniform.

* * * * *

UNITED STATES PATENT AND TRADEMARK OFFICE
CERTIFICATE OF CORRECTION

| | | |
|---|---|---|
| PATENT NO. | : 7,449,229 B2 | Page 1 of 1 |
| APPLICATION NO. | : 10/285449 | |
| DATED | : November 11, 2008 | |
| INVENTOR(S) | : Sean Robert Broker et al. | |

It is certified that error appears in the above-identified patent and that said Letters Patent is hereby corrected as shown below:

Column 12, Line 62, insert the term -- density -- between the term "uniform" and the "."

Signed and Sealed this

Seventh Day of April, 2009

JOHN DOLL
*Acting Director of the United States Patent and Trademark Office*